United States Patent [19]

Tominaga

[11] Patent Number: 4,811,194
[45] Date of Patent: Mar. 7, 1989

[54] OPTICAL INFORMATION PROCESSING APPARATUS

[75] Inventor: Hidekazu Tominaga, Yokohama, Japan

[73] Assignee: Canon Kabushiki Kaisha, Tokyo, Japan

[21] Appl. No.: 92,195

[22] Filed: Sep. 2, 1987

[30] Foreign Application Priority Data

Sep. 8, 1986 [JP] Japan .................. 61-209620

[51] Int. Cl.[4] .......................................... G11B 7/125
[52] U.S. Cl. ............................................ 369/45; 369/116
[58] Field of Search ............... 369/44, 45, 46, 111, 369/116, 54; 346/76 L; 250/201 DF; 235/470

[56] References Cited

U.S. PATENT DOCUMENTS

| | | | |
|---|---|---|---|
| 4,419,750 | 12/1983 | Howe | 369/116 |
| 4,656,617 | 4/1987 | Nakatsuyama et al. | 369/45 |
| 4,757,487 | 7/1988 | Yanagida et al. | 369/45 |

FOREIGN PATENT DOCUMENTS

| | | | |
|---|---|---|---|
| 52-67303 | 6/1977 | Japan | 369/116 |
| 52-67302 | 6/1977 | Japan | 369/116 |
| 59-177737 | 8/1984 | Japan | 369/116 |

*Primary Examiner*—Donald McElheny, Jr.
*Attorney, Agent, or Firm*—Fitzpatrick, Cella, Harper & Scinto

[57] ABSTRACT

There is disclosed an optical information processing apparatus comprising a scan device for effecting the recording and/or reproduction of information by scanning an optical record medium with a light beam spot, a detector for detecting the relative speed between the medium and the beam spot, and a controller for bringing the beam spot to a defocus state on the medium when the relative speed is detected to be a below a predetermined value.

6 Claims, 2 Drawing Sheets

OPTICAL INFORMATION PROCESSING APPARATUS

BACKGROUND OF THE INVENTION

1. Field of the Invention

The present invention relates to an optical information processing apparatus in which an optical recording member is scanned in relative manner with a light beam concentrated as a spot for recording and/or, reproducing information.

2. Related Background Art

In the field of optical information processing apparatus mentioned above, there are being developed various apparatus such as the so-called optical disk memory or optical card memory. In the recording, reproduction or erasure of information on the optical recording medium in such apparatus, it is necessary to provide the recording material with optical energy matching the function or property of the material. In general there stands the following relationship between the energies required for recording, reproduction and erasure of a recording medium:

reproducing energy < recording energy < erasing energy

Thus the reproducing energy is selected in the order of 1/5 to 1/20 of the recording energy, in order to prevent erroneous recording in the course of repeated reproductions.

As the energy absorbed by the recording medium is related to the power of the irradiating light energy and the irradiating time, it is governed not only by the intensity of the reproducing energy, but also by the moving speed relative to the recording medium, or the speed of the recording medium crossing the irradiating light. Consequently, even with a reproducing light of a very low energy level, if the moving speed of the recording medium is below a predetermined value, the irradiated area absorbs a level of energy exceeding the level required for recording, thus causing erroneous recording or eventual destruction of the recording medium. Such trouble may also occur at information recording. Even during the irradiation with a light beam of an ordinary recording intensity, if the relative speed of the light beam and the recording medium is lowered, the irradiated area may absorb a level of energy exceeding the recording level, thus eventually causing destruction of the recording material.

In order to prevent such trouble, the Japanese Patent Laid-open No. 67303/1977 discloses an optical information processing apparatus equipped with a mechanism for detecting the relative speed of the light beam and the recording medium, and, if that speed is below a predetermined value, inserting a shutter or a filter between the light source and the recording medium, thereby interrupting the light beam or reducing the intensity of the light beam.

However such apparatus is associated with the drawbacks of an increased number of component parts or of an increased dimension, because of the presence of the shutter and related mechanisms.

Also, the U.S. patent application Ser. No. 812,995 (allowed) of the assignee of the present application (Filed Dec. 24, 1985), proposes an optical information processing apparatus capable of preventing the above-mentioned trouble by
(i) turning off the light source;
(ii) reducing the intensity of the light source; or
(iii) displacing the light beam to another location; after the lapse of a predetermined time when the relative speed of the light beam and the recording medium becomes lower than a predetermined value. However the method (i) requires a certain time before the light emission from the light source is stabilized at the re-start of the reproducting operation etc. Also the method (ii) may not be able to provide a desired intensity, as the intensity after reduction is subjected to certain limitation. For example the semiconductor laser can change the light intensity only within a certain range, since the laser oscillation cannot be induced with a current not reaching the threshold value. In addition, the method (ii) is associated with the drawback of necessary waiting time for stabilization of the output when the intensity is elevated again, as in the method (i). On the other hand, the method (iii) is effective for preventing erroneous recording in the stand-by state, but is unable to cope with a malfunction of the scanning means for the light beam.

SUMMARY OF THE INVENTION

The object of the present invention is to provide an optical information processing apparatus not associated with the above-mentioned drawbacks of the prior technology, and capable of preventing erroneous recording with a simple structure and re-starting the recording or reproducing operation within a short time.

The above-mentioned object can be achieved, according to the present invention, by an optical information processing apparatus provided with scanning means for recording and/or reproduction of information by relative scanning of an optical recording medium with a light beam concentrated as a spot; means for detecting the relative speed of said medium and said light beam, and control means for bringing said light beam to a defocus state on the medium when the speed detected by the detecting means is below a predetermined value.

More specifically the present invention intends to reduce the energy of the irradiating light beam per unit area on the recording medium by the defocusing of the light beam, thereby preventing the aforementioned erroneous recording or destruction of recording material. For defocusing there can be employed an already existing actuator for automatic focusing, so that it is no longer necessary to utilize special means such as the conventional shutter mechanism. Also after defocusing of the light beam, the recording or reproducing operation can be promptly and smoothly reopened by re-starting the automatic focusing.

DETAILED DESCRIPTION OF THE PREFERRED EMBODIMENTS

Now the optical information processing apparatus of the present invention will be clarified in detail by preferred embodiments thereof.

Figure 1:
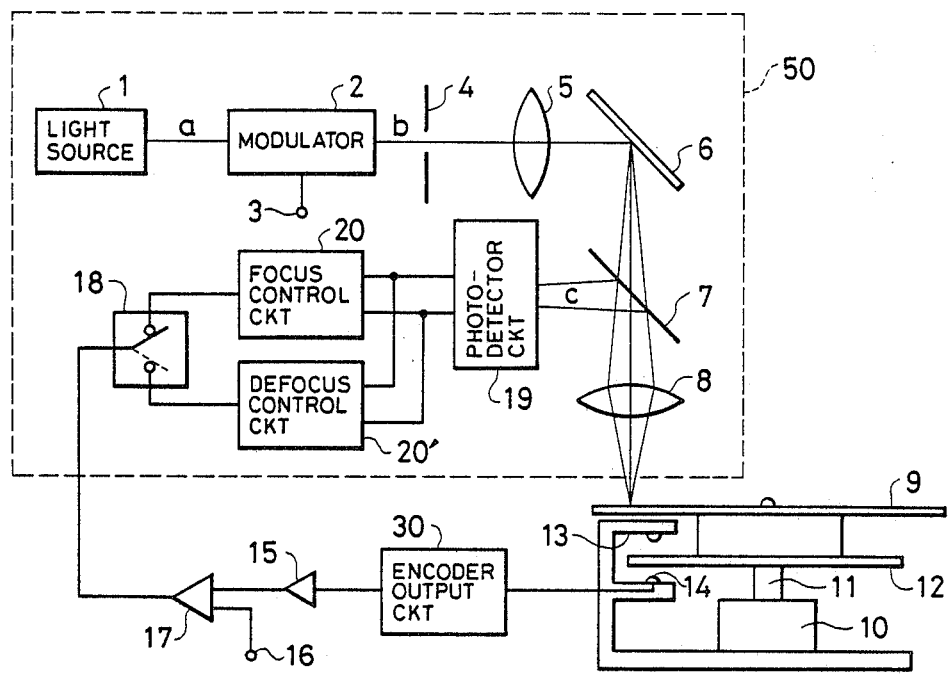
FIG. 1 is a schematic block diagram of an embodiment of the present invention applied to an optical disk memory.

FIG. 1 is a schematic view of an embodiment of the present invention applied to an optical disk memory.

In FIG. 1 there are shown a light source 1 such as a laser, and a light modulator 2 for modulating an input light a according to a signal supplied to an information signal input terminal 3, thus generating an output light b. The output light b from the light modulator 2 passes through an aperture provided in a flat plate 4 and reaches a projection lens 5. After passing through the lens 5, the light beam is deflected by a total-reflection mirror 6, then reaches an objective lens 8 through a beam splitter 7, and is projected onto an optical disk 9 constituting a recording medium with a diameter sufficiently concentrated by the lens 8. The light reflected by the optical disk 9 is separated by the beam splitter 7 from the incident light b to form a beam c.

Light beam c is received by a photodetector 19 for reading the information in the known manner. A focus control circuit 20 executes the focus control by moving the objective lens 8 in such a manner as to focus the incident light beam b onto the recording face of the optical disk 9, and an unrepresented tracking control circuit projects the light beam b exactly on a track on the optical disk. In FIG. 1, an area framed with broken lines constitutes an optical head 50.

The optical disk 9 is rotated by a motor 10 through a motor shaft 11. An encoder 12 fixed on motor shaft 11 is provided with slits at a constant pitch along the periphery, to generate on-off signals from a photocoupler composed of a light source 13 and a photodiode 14, whereby an encoder output circuit 30 releases electric output pulses.

A frequency-voltage (F-V) converter 15 generates an output voltage corresponding to the frequency of the pulses mentioned above, and a comparator 17 compares the output voltage of the F-V converter 15 with a reference voltage received at a terminal 16. In response to the output of said comparator 17, a switch 18 is opened or closed to effect focus control or defocus control. A focus control circuit 20 executes focus control in the normal speed, and a defocus control circuit 20' executes defocus control in an abnormal speed.

In the following there will be explained the function of the basic structure of the present invention explained above.

The rotating speed of the optical disk 9 is detected by the rotary encoder 12, and is converted into a corresponding voltage by the F-V converter 15. The reference voltage 16 is set at a value corresponding to a limit speed inducing an erroneous recording on the recording medium by the irradiating light, so that the comparison of two voltages allows detection of a state inducing erroneous recording. According to the result of the comparison, the switch 18 selects either the normal focus control or the defocus control for preventing the erroneous recording. The defocus control brings the light spot on the recording medium to a defocus state, thus increasing the irradiated area on the medium and reducing the irradiating energy per unit area, so that the absorbed energy does not reach the aforementioned recording energy even at a low-speed rotation and the erroneous recording can therefore be prevented.

Figure 2A:
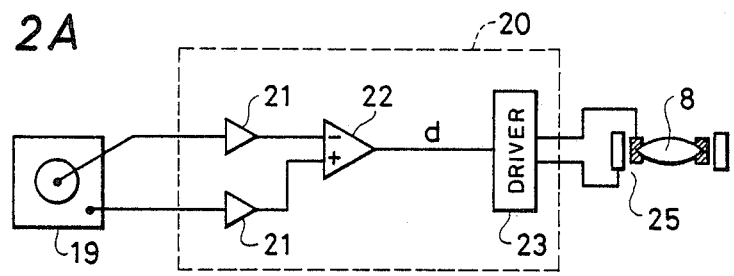
FIGS. 2A and 2B are block diagrams of a focus control circuit and a defocus control circuit shown in FIG. 1.
Figure 2B:
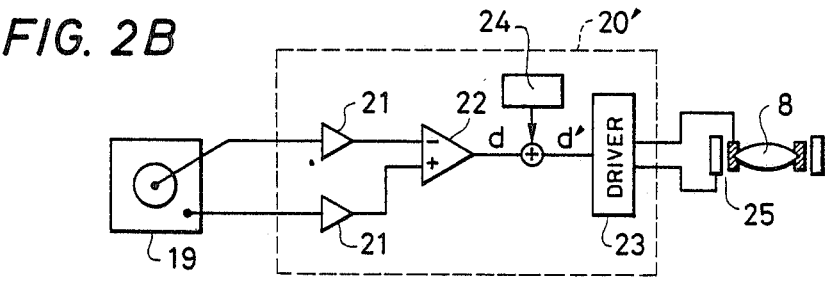
Figure 3:
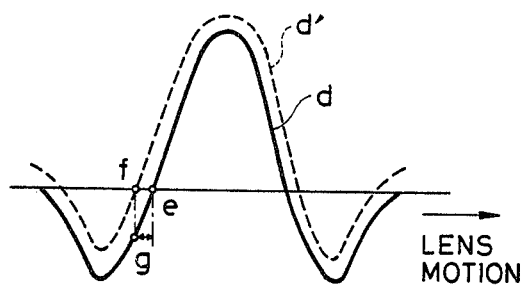
FIG. 3 is a chart showing the wave form of an error signal obtained in the embodiment shown in FIG. 1.

Now reference is made to FIGS. 2A to 3 for explaining the defocusing means. In the following it is assumed that the focus control is achieved by so-called beam size method.

FIG. 2A is a block diagram of a circuit for focus control in case the recording medium is driven at a predetermined speed. A photodetector 19 has a light-receiving face divided into a central area and a peripheral area, which respectively detect the intensities of the central portion and the peripheral portion of the reflected light beam c, thus generating corresponding electric signals. These signals are amplified by preamplifiers 21, and a differential amplifier 22 calculates the difference of the signals as an error signal d, which is supplied as an input signal to a driver 23. The driver 23 always drives an actuator 25 to move the objective lens 8 in such a direction as to reduce said error signal d.

The above-explained focus control circuit 20 can achieve focus control, since the photodetector is so positioned that the central area and the peripheral area of the light-receiving face receive equal amounts of light when the incident light b is in the focused state on the recording medium.

FIG. 2B is a block diagram for the defocus control at an abnormal rotating speed in the present embodiment.

In FIG. 2B, an error signal d is generated in the same manner as in FIG. 2A. In this defocus control, however, the driver 23 is given an error signal d', obtained by adding a bias voltage from a voltage source 24, to the error signal d. The driver 23 always drives the objective lens 8 in such a direction as to reduce the sum of the error signal d and the bias voltage. This control maintains the difference of the amounts of light, received by the central area and the peripheral area of the photodetector 19, at a constant value. Consequently the objective lens 8 is maintained at a position displaced, by a predetermined amount, from the focused position of the objective lens 8, so that the light spot on the recording medium is defocused.

FIG. 3 shows the wave form of the error signal in the above-explained embodiment, wherein the ordinate indicates the level of the error signal while the absissa indicates the amount of movement of the lens.

In FIG. 3, a solid line indicates the error signal d in the focus control circuit 20, and the control is so executed as to reach a point e where the error signal is zero and where the light spot is focused. A broken line indicates the error signal d' in the defocus control circuit 20', and the control is so executed as to reach a point f where the error signal d' is zero. The point f of the error signal d' corresponds to the point g of the error signal d, and this difference is caused by the bias voltage from the voltage source 24. In this manner the objective lens 8 is maintained at a position which is out of focus by a distance f-e.

In the foregoing embodiment the focus control is executed by the beam size method, but the present invention is applicable to other control methods, such as the astigmatism method or the wobbling method. Also as a variation to that embodiment, it is possible to use amplifiers 21, 22 and driver 23 commonly for the circuits 20 and 20' and to connect the switch 18 to the input terminal from the voltage source 24.

The present invention is not limited to an apparatus utilizing a disk-shaped recording medium as explained in the foregoing embodiment but is applicable also to the apparatus employing recording media of various shapes.

Figure 4:
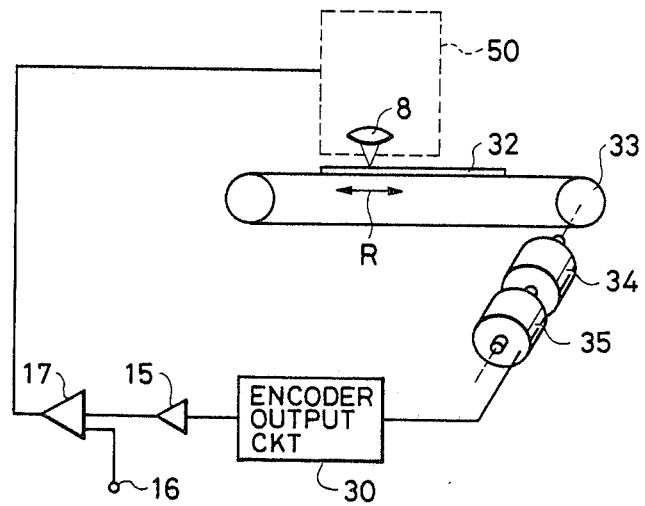
FIG. 4 is a schematic view of speed detecting means in case the present invention is applied to an optical card memory.

FIG. 4 schematically shows such an embodiment in which the present invention is applied to an optical card memory.

In FIG. 4 there are shown an optical card 32; a moving mechanism 33 for reciprocating the optical card 32 in a direction R with respect to an optical head 50; a motor 34 for driving the moving mechanism 33; a rotary encoder 35 for detecting the relative speed of a light beam emitted from the optical head 50 and the optical card; and an encoder output circuit 30 for deriving electric output pluses from the rotary encoder, and equivalent components to those in FIG. 1 are represented by same numbers.

Also in this embodiment, there may result erroneous recording or destruction of material on the optical card 32, if the reciprocating speed thereof becomes lower than a predetermined value, and, for this reason, a rotary encoder is provided as means for detecting the relative speed of the irradiating light beam and the recording medium, in the same manner as in the embodiment shown in FIG. 1. The principle of causing a defocused state in response to the signal from the encoder output circuit 36 is same as already explained in relation to FIG. 1, and will not therefore be explained further. The optical head 50 is almost identical to that shown in FIG. 1, but is provided with a mechanism specific for the apparatus for an optical card.

The rotary encoder in the present embodiment may be replaced by a linear encoder mounted on the moving mechanism 33 for detecting the relative speed.

The present invention is not limited to the foregoing embodiments but is subject to various modifications and variations.

For example, in place for the encoder for detecting the relative speed of the irradiating light with respect to the recording medium, there may be employed other speed detecting means, for example means for calculating the speed from the information pits recorded on the recording medium.

Also, the means for defocusing the light beam on the recording medium is not limited to the addition of a bias voltage to the focus error signal as explained in the foregoing embodiments. For example a constant current may be directly supplied to the actuator from a separate current source, in response to the output of the speed detecting means.

Such modifications and variations are all included in the present invention, as long as they are within the scope and spirit of the appended claims.

I claim:

1. An optical information processing apparatus comprising:
   scanning means for effecting at least one of recording and reproduction of information by scanning an optical recording medium with a light beam concentrated as a spot, by a relative movement thereof;
   means for detecting the relative speed of said medium and said light beam; and
   control means for bringing said light beam to a defocus state on said medium when the speed detected by said detecting means is below a predetermined value.

2. An optical information processing apparatus comprising:
   a light source;
   an optical system for concentrating a light beam emitted by said light source and irradiating an optical recording medium with said light beam;
   an actuator for moving at least a part of said optical system along an optical axis thereof;
   a photodetector for receiving the light beam reflected by said medium to generate a focus error signal;
   a feedback control circuit for driving said actuator in response to said focus error signal;
   medium drive means for causing a relative movement of said medium with respect to said light beam;
   means for detecting the relative speed of said medium and said light beam; and
   defocus means for adding a bias signal to said focus error signal to bring said light beam to a defocus state on said medium when the speed detected by said detecting means is below a predetermined value.

3. An optical information processing apparatus according to claim 2, wherein said speed detecting means is composed of an encoder mounted on said medium.

4. An optical information processing apparatus according to claim 2, wherein said medium is formed as a disk, and said medium drive means is composed of a motor for rotating said medium.

5. An optical information processing apparatus according to claim 2, wherein said medium is formed as a card, and said medium drive means is composed of a motor for reciprocating said medium.

6. An optical information processing apparatus according to claim 2, wherein said defocus means comprises a supply source of said bias signal; a comparator for comparing the output of said speed detecting means with a predetermined value; and a switch provided in said feedback control circuit and adapted to transmit the bias signal from said supply source according to the output of said comparator.

* * * * *